US006934280B1

(12) United States Patent
Ho et al.

(10) Patent No.: US 6,934,280 B1
(45) Date of Patent: Aug. 23, 2005

(54) MULTIPLE SERVICES EMULATION OVER A SINGLE NETWORK SERVICE

(75) Inventors: Chi Fai Ho, Sunnyvale, CA (US); Shashank Merchant, Santa Clara, CA (US); Amar Gupta, Cupertino, CA (US); Prabhas Kejriwal, Palo Alto, CA (US); Ravi Bail Bhat, Malleswaram (IN); Guatam Dewan, San Jose, CA (US)

(73) Assignee: Nokia, Inc., Irving, TX (US)

( * ) Notice: Subject to any disclaimer, the term of this patent is extended or adjusted under 35 U.S.C. 154(b) by 0 days.

(21) Appl. No.: 09/565,675

(22) Filed: May 4, 2000

(51) Int. Cl.[7] .................. H04L 12/66; H04L 12/28; H04J 3/16
(52) U.S. Cl. .............. 370/352; 370/401; 370/469; 370/474
(58) Field of Search .................. 370/229, 230, 370/230.1, 235, 394, 395.1, 395.5, 395.52, 370/401, 412, 465, 466–468, 473–474, 352, 370/392, 469

(56) References Cited

U.S. PATENT DOCUMENTS

| 5,315,588 | A | 5/1994 | Kajiwara et al. |
|---|---|---|---|
| 5,361,259 | A | 11/1994 | Hunt et al. |
| 5,490,140 | A | 2/1996 | Abensour et al. |
| 5,490,141 | A | 2/1996 | Lai et al. |
| 5,526,349 | A | 6/1996 | Diaz et al. |
| 5,625,625 | A | 4/1997 | Oskouy et al. |
| 5,987,030 | A | 11/1999 | Brockhage et al. |
| 5,987,034 | A | 11/1999 | Simon et al. |
| 5,999,518 | A | 12/1999 | Nattkemper et al. |
| 6,064,651 | A | 5/2000 | Rogers et al. |
| 6,094,437 | A | 7/2000 | Loehndorf, Jr. et al. |
| 6,137,791 | A | 10/2000 | Frid et al. |
| 6,157,614 | A | 12/2000 | Pasternak et al. |
| 6,169,735 | B1 | 1/2001 | Allen, Jr. et al. |
| 6,246,684 | B1 * | 6/2001 | Chapman et al. ........... 370/412 |
| 6,357,028 | B1 * | 3/2002 | Zhu ........................... 714/751 |
| 6,434,156 | B1 * | 8/2002 | Yeh ............................ 370/401 |
| 6,438,612 | B1 | 8/2002 | Ylonen et al. |
| 6,487,206 | B1 * | 11/2002 | Baruch et al. .......... 370/395.1 |
| 6,522,627 | B1 * | 2/2003 | Mauger ...................... 370/230 |
| 6,522,667 | B1 * | 2/2003 | Oda et al. ................... 370/474 |
| 6,542,504 | B1 * | 4/2003 | Mahler et al. .............. 370/392 |
| 6,598,034 | B1 * | 7/2003 | Kloth .......................... 706/47 |
| 6,611,522 | B1 * | 8/2003 | Zheng et al. .......... 370/395.21 |
| 6,611,531 | B1 | 8/2003 | Chen et al. |

(Continued)

FOREIGN PATENT DOCUMENTS

EP        0 691 769 A1      1/1996

(Continued)

OTHER PUBLICATIONS

W. Townsley, et al., "Alyer Two Tunneling Protocol "L2TP"," RFC 2661, Internet Engineering Task Force, Aug. 1999.

(Continued)

Primary Examiner—Andy Lee
(74) Attorney, Agent, or Firm—Squire, Sanders & Dempsey L.L.P.

(57) ABSTRACT

One embodiment of the present invention receives a plurality of network services, maps the plurality of network services to a single network service at a network layer higher than layer 2, and transmits the single network service. Another embodiment of the present invention receives a single network service at a network layer higher than layer 2, maps the single network service to a plurality of network services, and transmits the plurality of network services.

21 Claims, 8 Drawing Sheets

U.S. PATENT DOCUMENTS

| | | | |
|---|---|---|---|
| 6,633,571 B1 * | 10/2003 | Sakamoto et al. | 370/401 |
| 6,636,516 B1 * | 10/2003 | Yamano | 370/395.52 |
| 6,643,260 B1 * | 11/2003 | Kloth et al. | 370/235 |
| 6,643,496 B1 * | 11/2003 | Shimoyama et al. | 370/232 |
| 6,687,245 B2 * | 2/2004 | Fangman et al. | 370/356 |
| 6,769,000 B1 * | 7/2004 | Akhtar et al. | 707/103 R |
| 6,778,494 B1 * | 8/2004 | Mauger | 370/230 |

FOREIGN PATENT DOCUMENTS

| | | |
|---|---|---|
| EP | 0 921 666 A2 | 6/1999 |
| EP | 1 001 577 A1 | 5/2000 |
| WO | WO 97/27692 A1 | 7/1997 |
| WO | WO 00/30313 A2 | 5/2000 |

OTHER PUBLICATIONS

D. Ruffler, et al., "A Smart Node Architecture Linking Telephony with the Internet," XP000753882, Proceedings of International Conference on Computer Communication, vol. Conf. 13, pp. 77-81 (Nov. 19, 1997).

"Circuit Emulation Service Interoperability Speficiation," The ATM Forum Technical Committee, AF-SAA-0032.000 (Sep. 1995).

"Circuit Emulation Service Interoperability Specfication Version 2.0," The ATM Forum Technical Committee, af-vtoa-0078.000 (Jan. 1997).

E. Rosen, et al., "BGP/MPLS VPNs," RFC 2547, Internet Engineering Task Force, Mar. 1999.

George Swallow, "MPLS Advantages for Traffic Engineering," IEEE Communications Magazine, pp. 54-57 (Dec. 1999).

"The Technology of IP Routers in the New Public Network," Ericsson IP Infrastructure, pp. 1-21 (Jan. 2000).

"Unleash the Power, Building Multi-Service IP Networks with ATM Cores," The ATM Forum, pp. 1-12 (Mar. 1999).

Cisco Systems, "Scaling the Internet with Tag Switching," White Paper, pp. 1-7 (1996).

The Technology Guide Series, "Multiprotocol Label Switching (MPLS)," techguide.com, Ennovate Networks, Inc., pp. 1-47 (1998).

Francois Le Faucheur, "IETF Multiprotocol Label Switching (MPLS) Architecture," 1998 1st IEEE International Conference on pp. 6-15 (Jun. 22-24, 1998).

"OSI (Open Systems Internconnection)," Copyright 1996-2000, TechTarget.com, Inc., http://www.whatis.com/osi.htm, pp. 2 total.

"Open Systems Interconnection figure," Copyright 1966-2000, TechTarget.com, Inc., http://www.wahtis.com/osifig.htm, pp. 1 total.

Kummerle, K., "Multiplexor Performance for Integrated Line and Packet Switched Traffic," IBM, Switzerland, pp. 507-515 (1974).

* cited by examiner

MULTIPLE SERVICES EMULATION OVER A SINGLE NETWORK SERVICE

FIELD OF THE INVENTION

The present invention pertains to the field of networking. More particularly, this invention relates to emulating multiple network services over a single network service.

BACKGROUND OF THE INVENTION

Over the years, a wide variety of network technologies have been developed to carry various types of information. Early networks were designed with voice communications in mind. These networks were, and still are, primarily circuit-based networks. Time Division Multiplexing (TDM) is a common circuit-based network technology. In recent decades, the wide spread use of computers has led to the development of networks designed with data communications in mind. These data networks are primarily packet-based or cell-based. Examples of packet-based or cell-based network services include frame relay, ATM (asynchronous transfer mode), and IP (internet protocol).

Due to the wide spread usage of so many different kinds of network technologies, network providers have had to maintain several different networks to satisfy the needs of network users. For instance, a corporation may have invested millions of dollars in a private frame relay network. If the corporation wants to connect offices in different cities to the private network, the corporation can contract with a telephone company to provide frame relay services between the offices over a public frame relay network. Another corporation may have invested millions of dollars in a private ATM network. If the telephone company maintains public networks for both frame relay and ATM services, the second corporation can also contract with the telephone company to connect offices in different cities. Of course, the telephone company will probably also have to maintain TDM services for voice communications as well as IP services for public internet traffic.

Maintaining all of these public networks is very expensive. Network providers would prefer to maintain just one public network. Many network users, however, have invested heavily in particular types of private network services and are therefore reluctant to modify or abandon existing networks to accommodate the desires of network providers.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

An embodiment of the present invention maps multiple network services to and/or from a single network service. By using embodiments of the present invention at the intersections between private networks and public networks, network providers can maintain a single public network service and still accommodate the variety of private network services that users want.

Figure 1:
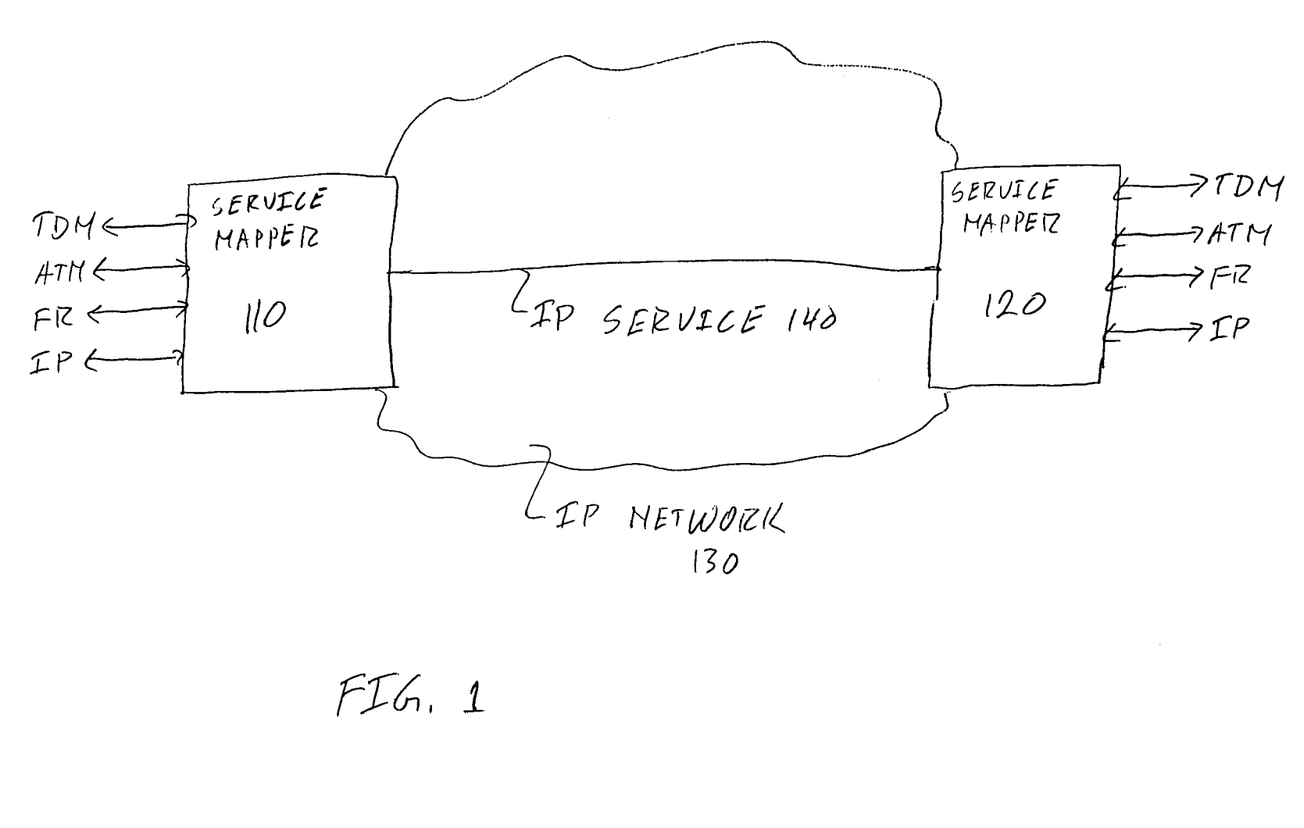
FIG. 1 illustrates one embodiment of a single network service emulating multiple network services.

FIG. 1 illustrates one embodiment of emulating multiple network services over a single, unified network service according to the teachings of the present invention. In the illustrated embodiment, time division multiplexing (TDM) services, asynchronous transfer mode (ATM) services, frame relay (FR) services, and internet protocol (IP) services are received by service mapper 110. Service mapper 110 maps all of the services to an IP service 140 and transmits IP service 140 through a public IP network 130. At the other end of IP service 140, service mapper 120 maps IP service 140 back into the variety of network services and re-transmits the variety of services. The same procedure can be performed in the opposite direction, from service mapper 120 to service mapper 110.

In other embodiments, a variety of additional or different services can be mapped to a single, unified service. For instance, private network services such as voice over IP or voice over ATM could be mapped to a unified service. Similarly, in alternate embodiments, any of a number of network services could be used for the unified service.

Using IP, however, for the unified service has a number of advantages. For instance, the volume of data communications is likely to substantially exceed the volume of voice communications in the future. Given the fact that packet-based services tend to be more efficient for data traffic, a packet-based service, such as IP, is likely to be more efficient than a circuit-based service such as TDM.

Furthermore, IP hardware, such as an IP router, is usually much less expensive than an TDM switch and can often provide much more capacity. Less support personnel is usually required to mange IP equipment compared to TDM equipment as well. Consequently, a network provider can usually deploy an IP network at a fraction of the cost of a TDM network.

Those skilled in the art may think mapping multiple services to IP appears odd at first. IP and the variety of services mentioned above operate at different "layers" in the standard 7-layer reference model for network communications. The layers of the standard reference model tend to build on one another. For instance, integrated services data network (ISDN) is usually considered a layer 1 service. ISDN is a circuit-based digital network service and it provides the hardware for sending and receiving data. ATM is usually considered a layer 2 service. ATM provides a transmission protocol for sending data over a layer 1 service like ISDN. IP is usually considered a layer 3 service. IP provides routing and forwarding capability over a layer 2 service like ATM. Transmission control protocol (TCP) is usually considered a layer 4 protocol. TCP ensures complete data transfer by performing error-checking and making sure all of the data has arrived. TCP operates over a layer 3 service like IP. So, a data transmission from one computer to another may include a layer 4 TCP service over a layer 3 IP service over a layer 2 ATM service over a layer 1 ISDN service.

The present invention maps various service layers, such as layers 1 through 4, to a single layer, such as layer 3 in the illustrated embodiment. Mapping a layer 1 service up to layer 3, transmitting it as a layer 3 service, and then mapping it back down to layer 1 may appear inefficient at first. After all, in the current network environment, the layer 3 service is likely to travel over a layer 1 service so it would appear to be a waste of time to map up and then back down again. By utilizing the present invention, however, the entire infrastructure of networking can change to a more cost effective model, much like the internet can change the infrastructure of commercial transactions.

Consider the following analogy. A traditional retail book seller maintains retail stores in multiple locations, retail staff at each location, at least one warehouse, and a warehouse staff. An internet book seller, in contrast, has a staff to maintain a website which sends book orders from customers directly to publishers. The publishers, in turn, ship books directly to the individual customers. The delivery costs for the internet book seller are likely to be higher on a per book basis compared to delivery costs for the retail book seller, but the internet book seller does not need to maintain the retail locations and staff. By trading a certain amount of inefficiency in higher delivery costs for less support staff and less real estate, the internet model is likely to be more cost effective.

With the present invention, network providers may experience a certain amount of inefficiency when mapping multiple services to one service, but the network providers will likely save considerably by maintaining one network. Moreover, the present invention will allow network providers and network users to gradually migrate to a single unified service on both private and public networks.

One technique for converting from layer 1 to layer 3 is discussed in U.S. patent application Ser. No. 09/378,201, U.S. Pat. No. 6,870,837, filed on Aug. 18, 1999, titled "Circuit Emulation Service over an Internet Protocol Network," in which a constant bit rate data stream, such as TDM data, is encapsulated in IP packets to be sent through an IP network and reassembled into the constant bit rate data stream on the other side. Referring again to FIG. 1, the circuit emulation service over IP (CESIP) described in the 09/378,201 U.S. Pat. No. 6,870,837 application could be used for mapping the TDM service to IP service 140. In various embodiments, the present invention incorporates the CESIP service with multiple other services simultaneously as discussed more fully below.

Figure 2:
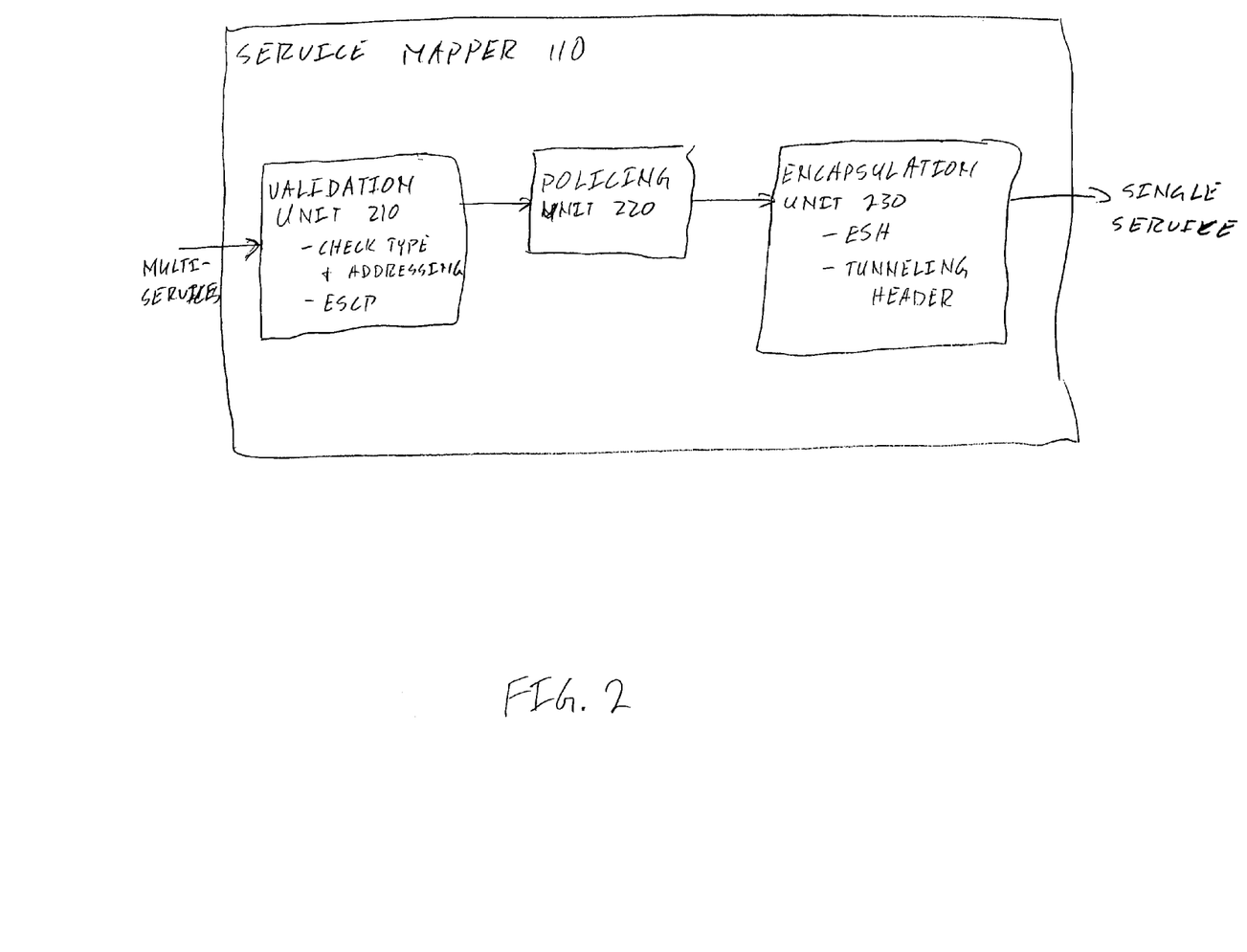
FIG. 2 illustrates one embodiment of a service mapper for mapping multiple services to a single service.

FIG. 2 illustrates one embodiment of service mapper 110 in greater detail. The illustrated embodiment is for mapping multiple services to a single service. Service mapper 110 may receive and emulate several different network services simultaneously. Taking frame relay (FR) as an example of one of the services, FR services comprise frames of data of variable length. FR may be used for any number of data services such as voice of FR, systems network architecture (SNA) communications, IP packets, etc.

Each frame includes a data link connection identifier (DLCI) which indicates a destination address for the frame. Validation unit 210 uses the DLCI and a port number from which the frame was received to determine if the frame is a valid frame. That is, validation unit 210 validates that the frame is of the of the type of frame expected from a given port (not shown) and validates that the address to which the frame is directed is a valid address.

Validation unit 210 also initiates a control protocol called emulation service control protocol (ESCP). ESCP is used to set up connections between service mapper 110 and service mapper 120. ESCP establishes a control channel across IP network 130 using regular IP transactions. Each FR service has associated with it a local management interface (LMI) which defines the interface between the private FR service and the service mapper 110. In order to emulate the FR service on the other side of IP network 130, the remote service mapper 120 needs to be configured with the LMI information. To accomplish this, an ESCP transaction includes an extension for "provisioning" mapper 120 according to the LMI. That is, mapper 120 is told what kind of resources it will need to provide in order to support this particular service. Each service may be given its own "channel" through the remote mapper 120. For example, mapper 120 may need to provide resources for one or more FR services and one or more ATM services. Another ESCP transaction includes an extension for "configuring" a channel provided at mapper 120 based on the LMI. For example, mapper 120 may be configured to support a particular data rate and maximum frame size. Another ESCP transaction includes an extension for "monitoring" quality of service based on the LMI. For instance, the ESCP control channel can be used to send alarm information if a data transmission fails unexpectedly or changes data rates unexpectedly.

Policing unit 220 monitors the FR service for violations of a service level agreement. A FR service level agreement is defined by four parameters—committed information rate (CIR), excess information rate (EIR), committed burst, and excess burst. The service level agreement may be, for instance, a contract between a network user and a network provider. If policing unit 220 detects a violation of one or more of the service level parameters, policing unit 220 implements a policy according to the service level agreement. For instance, the policing unit may merely inform the user of the violation, may drop data to reduce the data rate to an agreed upon level, or may lower a priority associated with one or more frames. Lower priority frames are more likely to be dropped later on in the network if, for instance, data traffic gets heavy.

Encapsulation unit 230 encapsulates a frame by attaching an encapsulation services header (ESH) to the frame. FR assumes that frames will be delivered in the order in which they are sent. IP, however, does not guarantee delivery order. In IP services, different packets of data may take different paths through the network and different paths may have different transmission delays. As a result, packets are likely to arrive out of order. In which case, to recover the FR frames in order, the ESH includes a sequence number for each frame with respect to other frames in the FR service. As discussed below, the sequence numbers are used to re-order the frames on the receiving side. The ESH can also include other data, such as the length of the frame, compression options and encryption options where applicable, and control flags for managing various transmission conditions.

In addition to the ESH, encapsulation unit 230 also attaches a tunneling header to an encapsulated frame. For instance, in one embodiment, encapsulation unit 230 uses layer 2 tunneling protocol (L2TP) tunneling. L2TP is well known in the art, and is widely used to transport packets across a network in a way that is intended to be transparent to end users. Any number of alternate tunneling protocols can also be used. Tunneling usually involves some form of address, route, and/or connection look-up based on the destination address as designated, for instance, by the DLCI header for a frame.

Based on the look-up, encapsulation unit 230 may not initiate tunneling. For instance, some DLCI headers indicate that tunneling need not be used. That is, encapsulation unit 230 can also perform local switching where, for instance, a frame was received from one port coupled to service mapper 110, and is destined for another port coupled to service mapper 110. In which case, the frame would not need to be encapsulated and transmitted through IP service 140. Instead, the frame could be routed directly to the correct port.

In an alternate embodiment, encapsulation unit 230 also performs frame segmentation. For instance, where the single service is an IP service and the IP service has a maximum transmission unit (MTU), encapsulation unit 230 can fragment long frames into sizes smaller than the MTU prior to sending the frames. IP networks have the ability built-in to divide frames into fragments that are smaller than the MTU, but the built-in IP process is typically comparatively inefficient. The inventive fragmentation involves attaching a header to each fragment including not only a sequence number for the frame to which each fragment belongs, but also an offset value indicating where in the frame the fragment belongs.

Figure 3:
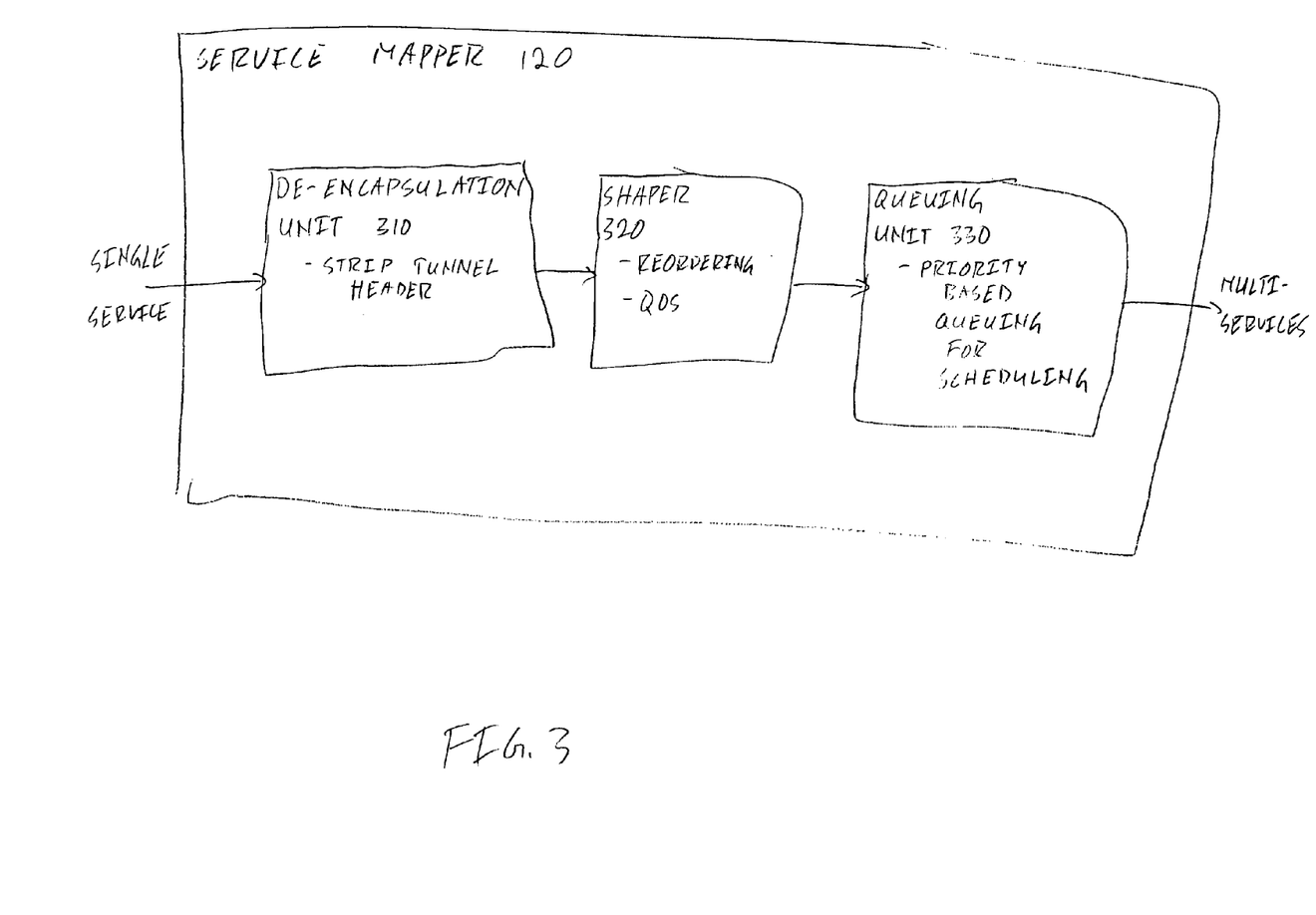
FIG. 3 illustrates one embodiment of a service mapper for mapping a single service to multiple services.

FIG. 3 illustrates one embodiment of service mapper 120 in greater detail. The illustrated embodiment is for mapping a single service to multiple services. De-encapsulation unit 310 strips off the tunneling header and directs the frame to the appropriate channel in shaper 320. That is, as discussed above, multiple network services may be simultaneously emulated and each network service may take a different channel through shaper 320. Based on the tunneling header, de-encapsulation unit 310 can determine which channel to direct a frame to.

Shaper 320 re-orders the channels. As with CESIP, shaper 320 uses a re-order buffer, but unlike the re-order buffer for CESIP, most other network services, such as frame relay (FR), are not required to provide a continuous stream of data at a constant bit rate. The amount of time between frames can vary. In which case, the re-order buffer used for FR does not involve the same time constraints as the CESIP re-order buffer.

Figure 4:
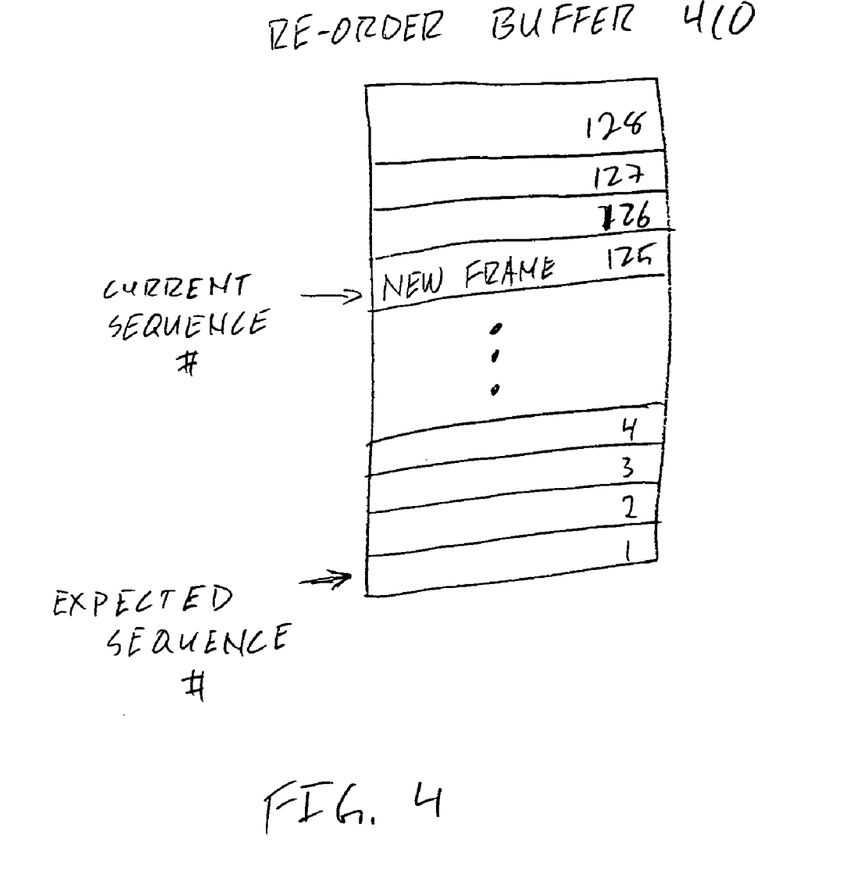
FIG. 4 illustrates one embodiment of a re-order buffer.

FIG. 4 illustrates one embodiment of a re-order buffer for one channel of a FR service. As stated above, each frame is encapsulated with a sequence number. In general, if the sequence number of a newly arrived frame equals the expected sequence number, the frame is immediately ready to be sent. If the sequence number of a newly arrived frame is before the expected sequence number, the frame is dropped. That is, the frame has arrived too late and the process has already passed it by. It is usually better to drop a frame of data than insert a frame of data out of order. FR assumes in-order delivery. FR has procedures for dealing with lost frames, but is less prepared for dealing with out-of-order frames. For instance, lost frames may simply be resent.

If the newly received frame has a sequence number after the current sequence number, the frame will be stored at a memory location relative to the expected sequence number. For instance, in the illustrated embodiment, the current sequence number is 125 frames after the expected sequence number so the frame is stored in location 125. The expected sequence number is advanced every time a sequence number matches the expected sequence number. So, for instance, if frames 2 through 4 have been received and stored while waiting for frame 1, as soon as frame 1 arrives, the expected sequence number will advance through frames 1 through 4, and each frame will be ready to be sent.

In an alternate embodiment where fragmentation is enabled as discussed above to reduce frame sizes to below the maximum transmission unit (MTU), buffer 410 becomes a two-dimensional buffer. That is, each frame may consist of one or more fragments, and frames are assembled from their fragments based on off-set indicators among the encapsulation services header (ESH) information before a frame is further acted upon. In other words, a partial frame will not be sent from shaper 320.

Although buffer 410 is illustrated as a linear memory, it may actually be a circular memory where pointers point to memory locations at which the frames of data are stored. For instance, where the length of frames are variable, it may be impossible to determine the beginning and ending addresses for out-of-order frames, and therefore impossible to determine where in the buffer to store an out-of-order frame. Any number of memory structures can be used for re-order buffer 410.

A frame may be lost forever. In order to prevent buffer 410 from stalling while waiting for a lost frame, one embodiment of the invention uses a time-out feature to advance the expected sequence number if a packet is not received within a particular time.

In the illustrated embodiment, re-order buffer 410 includes room for storing up to 128 frames in memory. Other embodiments of re-order buffer 410 may store more or fewer frames. In one embodiment, the number of frames stored depends on the maximum delay that the re-order buffer can introduce without violating a service level agreement. For instance, if a service level agreement specifies a certain maximum delay, based on a certain data rate, the number of frames that can be sent without violating the delay constraint can be estimated. If the number of frames that accumulate in the buffer approaches the estimated number of frames, there is a good likelihood that the delay between the first frame and the last stored frame is approaching the delay constraint. In which case, frames can either be dropped or sent on for further processing as the buffer gets full.

In an alternate embodiment, each frame referenced by buffer 410 is given a time stamp when the frame arrives. Rather than storing a limited number of frames to limit the delay through the buffer, the delay can be limited by only storing a frame for a certain duration after it is received.

In yet another embodiment, frame re-ordering is an premium service. Re-order processing can be expensive, and many customers do not require that their data be re-ordered. For instance, if frame relay is being used to carry an IP service, even though frame relay assumes packets are received in order, in-order delivery is irrelevant to IP services. In which case, a user can elect to not include re-ordering if re-ordering is not necessary.

Returning to FIG. 3, in addition to re-ordering, shaper 320 can also maintain quality of service (QOS) by "smoothing" the output stream based on the service level agreement. For instance, data rates may have been established during the provisioning and configuring of the data channel based on the local management interface (LMI). Frames may be received in bursts by shaper 320 at sporadic rates. In which case, shaper 320 can output the frames at a rate consistent with the data rates. If shaper 320 sends the frames faster than specified by the service level agreement, the user may not be able to handle the data rate and may drop some data. On the other hand, if shaper 320 sends the frames slower than specified by the service level agreement, the user may complain that the user's service is not being fully utilized.

Queuing unit 330 queues all of the data intended for a particular port (not shown). For instance, queuing unit 330 may include a number of queues for each port, wherein each queue for a give port corresponds to different levels of priority data. For instance, a set of queues corresponding to a port may include a high priority queue for a constant bit data stream such as a circuit emulation service, a medium priority queue for time critical data such as voice over IP, and a low priority queue for best effort traffic.

In general, emulating multiple services according to the teachings of the present invention involves mapping each service to a single service, transmitting the single service, and mapping the single service back to the multiple services. Each of the multiple services, however, have certain distinctions within the general scheme.

Figure 5:
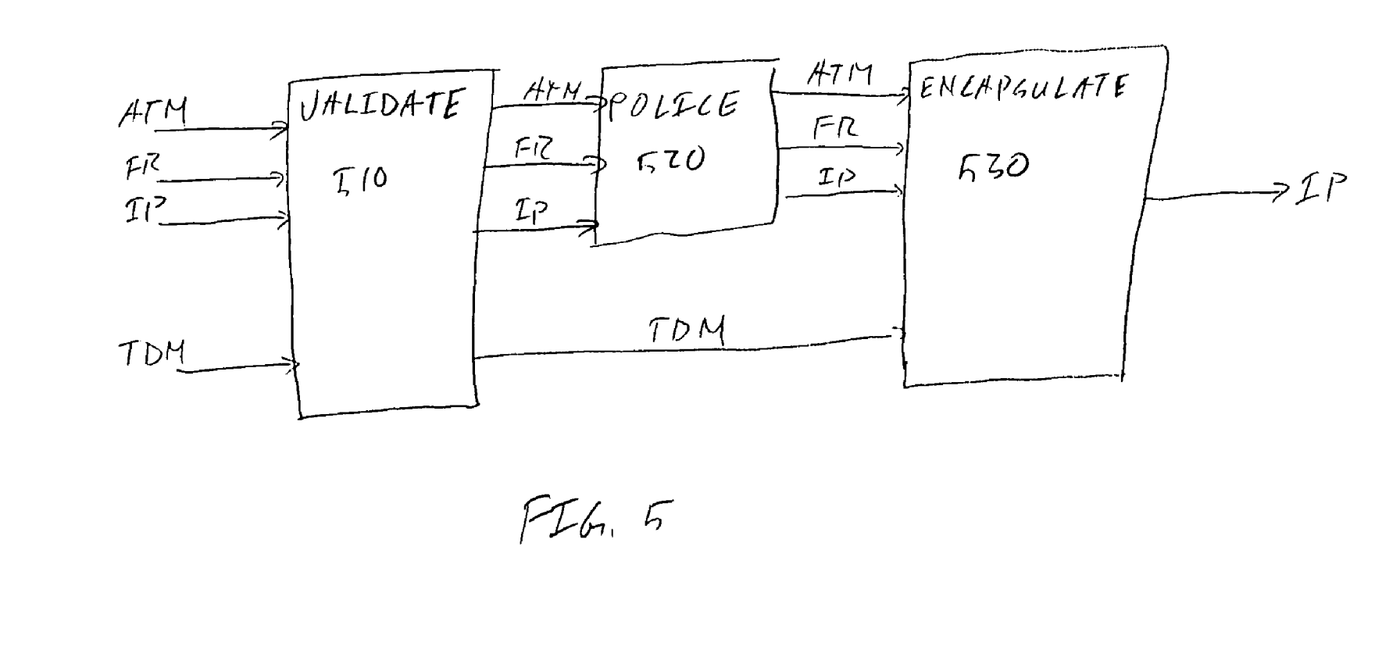
FIG. 5 illustrates one embodiment of service dependent mapping.

FIG. 5 illustrates one embodiment of a unified multiple service emulation device for mapping to one service according to the teachings of the present invention. In the illustrated embodiment, TDM skips policing 520. That is, TDM is a constant bit rate service. Since the bit rate should never change, there is no need to monitor the TDM bit rate.

Asynchronous transfer mode (ATM) services are handled for the most part in the same way that frame relay (FR) services as handled, as discussed above. In general, ATM is cell-based, and each cell has its own header and payload. In FIG. 5, ATM and frame relay can both be validated based on header information and port information by validation block 510.

ATM has different service level agreement parameters compared to frame relay. However, in various embodiments, a unified set of parameters can be used to police both frame relay and ATM by police block 520.

Different types of ATM services create some additional distinctions. For instance, AAL5 (ATM adaptation layer 5) is one type of ATM service that is "packet based." In AAL5, one or more ATM cells comprise a packet, and cells for several packets can be multiplexed. In one embodiment of the present invention, for packet-based ATM, a packet of cells is accumulated before providing the entire packet for validation in block 510. For other ATM services which are cell-based, as opposed to packet-based, each ATM cell is treated like a separate frame.

Internet protocol (IP) services are usually carried on top of layer 2 services, such as a frame relay service or ATM service. In which case, an IP service looks just like a frame relay service or an ATM service. IP services are handled just like any other layer 2 service until the encapsulation block 530 is reached. Encapsulation block 530 looks inside layer 2 services to see if an IP service is inside. If a public IP packet is inside, encapsulation block 530 acts as a router and ships the IP packet off to its destination. That is, there's no need to map the IP block to another IP block. If a private IP packet is inside, the IP packet is encapsulated like a frame or cell. An example of a private IP packet is one that uses an address scheme that is not available for public network addressing. With the exception of public IP services, encapsulation block 530 encapsulates all four services.

Figure 6:
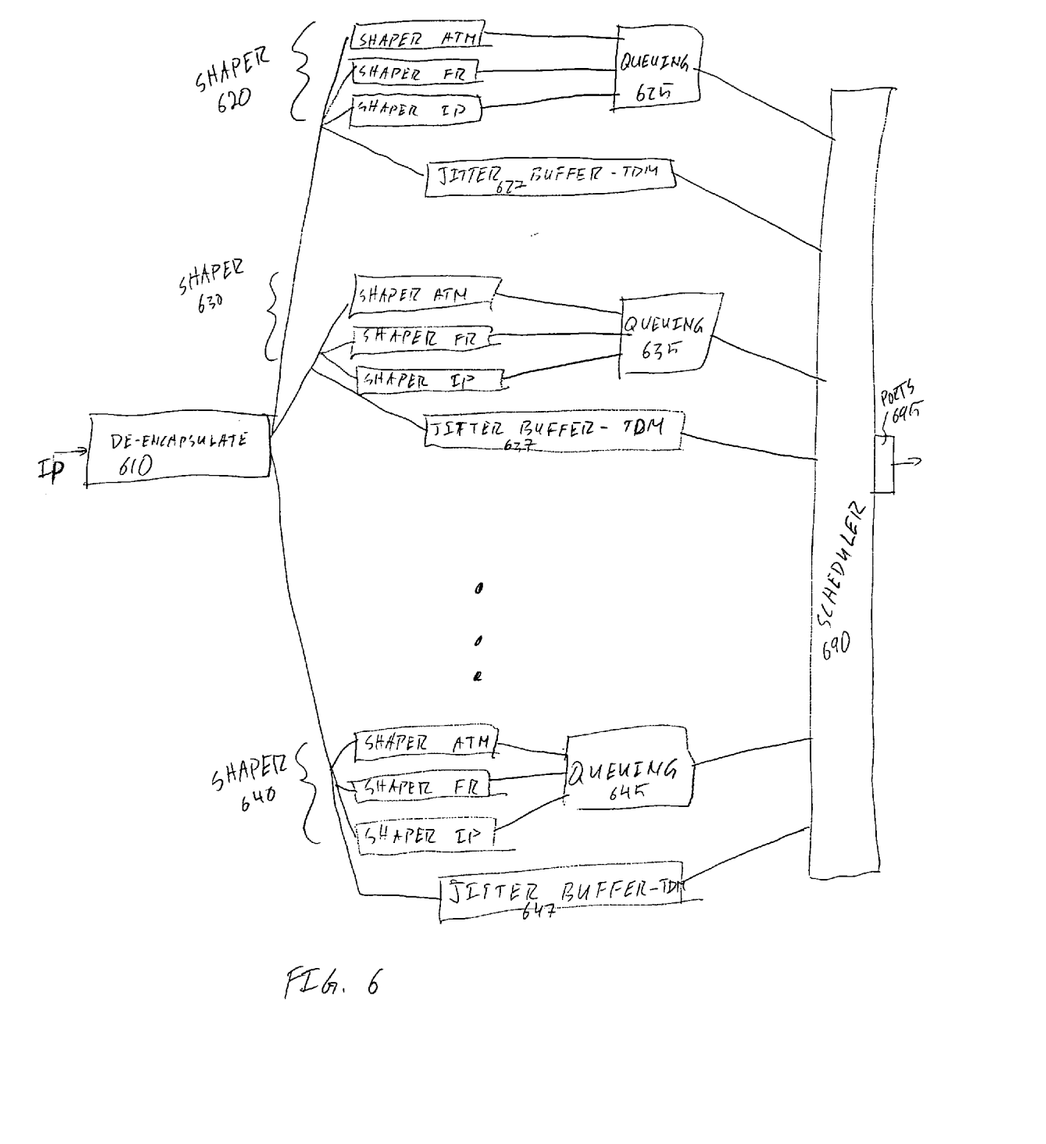
FIG. 6 illustrates one embodiment of service dependent mapping.

FIG. 6 illustrates one embodiment of a unified multiple service emulation device for mapping from one service to multiple services according to the teachings of the present invention. All of the services go through the same de-encapsulation block 610. From there however, de-encapsulation block 610 directs the packets to appropriate places depending upon the type of service being emulated and the channel of the service being emulated. As shown in FIG. 6, many different channels can be emulated at once for many different network services.

TDM services are directed to jitter buffers 627, 637, and 647. TDM services bypass shaping and queuing and couple directly to scheduler 690. Scheduling is the same for all of the services. Based on the priority of the respective service and the availability of ports 695, scheduler 690 selects data for transmission. In various embodiments, scheduler 690 may schedule transfers from a large number of queues and jitter buffers to a large number of ports 695.

ATM cells have a fixed length, unlike frames which can have variable lengths. ATM, like frame relay, assumes cells will be received in order. In which case, as with frame relay, shaping ATM cells involves re-ordering cells. ATM can also have a variable data rate like frame relays, so shaping ATM cells can also involve smoothing.

Queuing ATM cells may depend on the type of ATM cells. For instance, packet-based ATM cells may be re-fragmented into cells before being queued in queues 625, 635, and 645.

Figure 7:
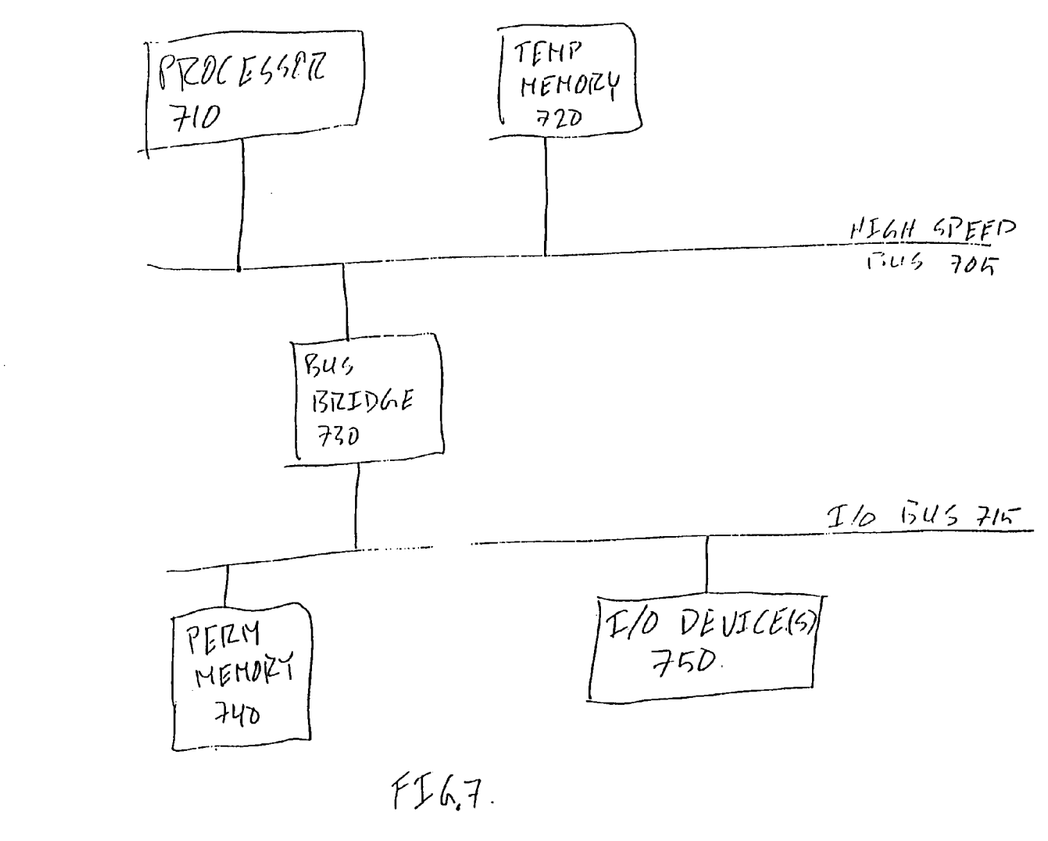
FIG. 7 illustrates one embodiment of a hardware system.

FIG. 7 illustrates one embodiment of a hardware system intended to represent a broad category of computer systems such as personal computers, workstations, and/or embedded systems. In the illustrated embodiment, the hardware system includes processor 710 coupled to high speed bus 705, which is coupled to input/output (I/O) bus 715 through bus bridge 730. Temporary memory 720 is coupled to bus 705. Permanent memory 740 is coupled to bus 715. I/O device 750 is also coupled to bus 715. I/O device(s) 750 may include a display device, a keyboard, one or more external network interfaces, etc.

Certain embodiments may include additional components, may not require all of the above components, or may combine one or more components. For instance, temporary memory 720 may be on-chip with processor 710. Alternately, permanent memory 740 may be eliminated and temporary memory 720 may be replaced with an electrically erasable programmable read only memory (EEPROM), wherein software routines are executed in place from the EEPROM. Some implementations may employ a single bus, to which all of the components are coupled, or one or more additional buses and bus bridges to which various components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

Figure 8:
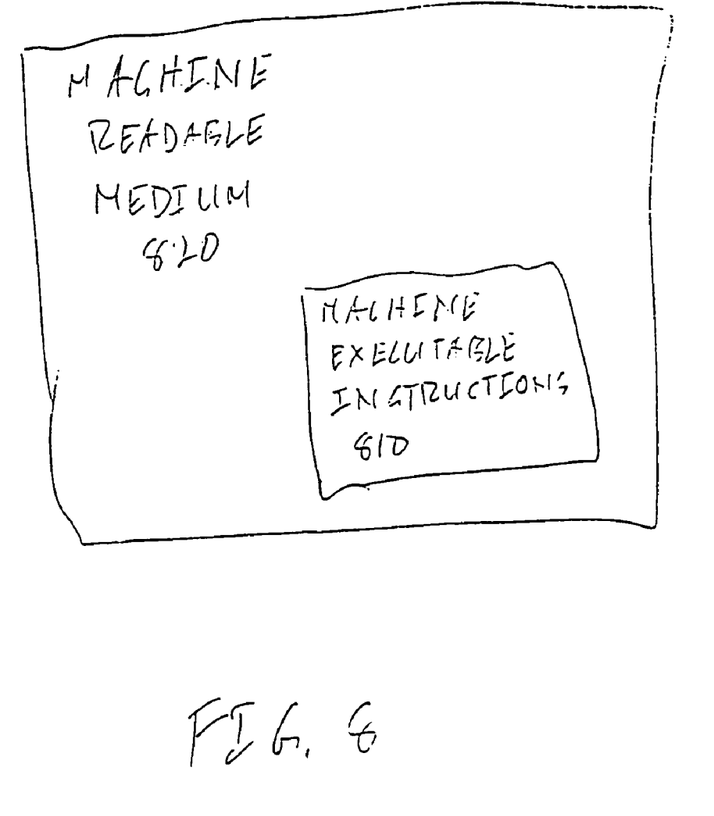
FIG. 8 illustrates one embodiment of a machine readable storage medium.

In one embodiment, the multi-services emulator, as described above, is implemented using one or more computers such as the hardware system of FIG. 7. Where more than one computer is used, the systems can be coupled to communicate over an external network, such as a local area network (LAN), an IP network, etc. In one embodiment, the present invention is implemented as software routines executed by the computer(s). For a given computer, the software routines can be stored on a storage device, such as permanent memory 740. Alternately, as shown in FIG. 8, the software routines can be machine executable instructions 810 stored using any machine readable storage medium 820, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device 750. The instructions may be copied from the storage device into temporary memory 720 and then accessed and executed by processor 710. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. In another example, the present invention could be implemented in one or more ASICs on additional circuit boards and the circuit boards could be inserted into the computer(s) described above. In another example, field programmable gate arrays (FPGAs) or static programmable gate arrays (SPGA) could be used to implement the present invention. In yet another example, a combination or hardware and software could be used to implement the present invention.

Thus, a method and apparatus to emulate multiple network services using a single network service is described. Numerous specific details have been set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description have been presented using terminology commonly employed by those skilled in the art to convey the substance of their work to others skilled in the art. Also, parts of the description have been presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations have been described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   receiving a plurality of network services in a first service mapper wherein at least one of the plurality of network services is different from at least another one of the plurality of network services;
   in the first service mapper, validating a port number for each of the plurality of network services, policing each of the plurality of network services for a violation of an agreement and encapsulating required ones of the plurality of services;
   mapping the plurality of network services to a single network service, said single network service comprising a network service at a network layer higher than layer 2;
   transmitting the single network service to a second service mapper; and
   in the second service mapper, mapping the single network service into the plurality of network services.

2. The method of claim 1 wherein the plurality of network services comprise at least one of a layer 1 service and a layer 2 service, and the single network service comprises a layer 3 service.

3. The method of claim 1 wherein the plurality of network services comprise at least one of time division multiplexing (TDM) based services, frame relay services, asynchronous transfer mode (ATM) services, transparent local area network (LAN) services, Ethernet services, private Internet protocol (IP) services, and public IP services, and wherein the single network service comprises an Internet protocol (IP) service.

4. The method of claim 1 wherein mapping the plurality of network services to the single network service comprises:
   validating that a data transmission is formatted according to one of the plurality network services and is directed to a valid destination.

5. The method of claim 1 wherein mapping the plurality of network services to the single network service comprises:
   policing a data transmission formatted according to one of the plurality of network services to enforce a service level agreement; and
   applying a policy if a violation of the service level agreement occurs.

6. The method of claim 5 wherein said service level agreement comprises at least one of a committed information rate (CIR), an excess information rate (EIR), a committed burst, and an excess burst.

7. The method of claim 5 wherein applying said policy comprises at least one of:
   issuing a notification of the violation to a customer;
   lowering a priority of at least a portion of the data transmission; and
   dropping at least a portion of the data transmission.

8. The method of claim 1 wherein mapping the plurality of network services to the single network service comprises:
   encapsulating a data transmission formatted according to one of the plurality of network services in a packet formatted according to the single network service.

9. The method of claim 8 wherein encapsulating the data transmission comprises:
   receiving a packet of data, said packet of data being one of a plurality of data packets comprising the data transmission;
   adding an encapsulation services header (ESH) to the packet of data, said ESH comprising at least one of a sequence number of the packet of data indicating a relative position of the packet of data among the plurality of data packets, compression/encryption options for the packet of data, a length of the packet of data, and control flags for condition management of the data transmission.

10. The method of claim 1 wherein mapping the plurality of network services to the single network service comprises:
   receiving a packet of data, said packet of data being one of a plurality of packets of data comprising a data transmission formatted according to one of the plurality of network services; and
   fragmenting the packet of data into a plurality of segments.

11. The method of claim 1 wherein mapping the plurality of network services to the single network service comprises:
   stripping a tunnel from a received data transmission formatted according to one of the plurality network services;

passing the received data transmission if the received data transmission is a public Internet protocol (IP) transmission; and encapsulating the received data transmission if the received data transmission is a private Internet protocol (IP) transmission.

12. The method of claim 1 wherein mapping the plurality of network services to the single network service comprises:

receiving a data transmission formatted according to one of the plurality of network services;

fragmenting data packets of the data transmission into segments smaller than a maximum transmission unit (MTU) of the single network service; and encapsulating each segment with an indication of where the segment fits into the respective data packet.

13. The method of claim 1 wherein transmitting the single network service comprises:

tunneling the single network service through at least one tunnel.

14. The method of claim 13 wherein the at least one tunnel comprises a layer 2 tunneling protocol (L2TP) tunnel through an Internet protocol (IP) network.

15. The method of claim 1 wherein transmitting the single network service comprises:

performing a local switching from a first port to a second port.

16. The method of claim 1 further comprising:

establishing a control link with a remote device through the single network service.

17. The method of claim 16 wherein said control link is used to manage a particular one of the plurality of network services, wherein said particular one of the plurality of network services comprises a local management interface (LMI), and wherein establishing the control link comprises:

exchanging emulation service control protocol (ESCP) data with the remote device, said ESCP data to define the LMI.

18. The method of claim 17 wherein exchanging the ESCP data comprises:

exchanging a first ESCP extension to provision resources at the remote device based on the LMI;

exchanging a second ESCP extension to configure the resources at the remote device for at least one of a data rate and a frame size based on the LMI; and exchanging a third ESCP extension with the remote device to monitor quality of service based on the LMI.

19. The method of claim 1 wherein receiving the plurality of network services comprises:

receiving a plurality of asynchronous transfer mode (ATM) cells comprising a plurality of data frames, said plurality of ATM cells being interleaved; and accumulating respective ones of the plurality of ATM cells into corresponding ones of said plurality of data frames, wherein mapping the plurality of network services to a single network service is performed on a data frame basis.

20. A machine readable storage medium having stored thereon machine executable instructions, execution of said machine executable instructions to implement a method comprising:

receiving a plurality of network services in a first service mapper wherein at least one of the plurality of network services is different from at least another one of the plurality of network services;

in the first service mapper, validating a port number for each of the plurality of network services, policing each of the plurality of network services for a violation of an agreement and encapsulating required ones of the plurality of services;

mapping the plurality of network services to a single network service, said single network service comprising a network service at a network layer higher than layer 2;

transmitting the single network service to a second service mapper; and in the second service mapper, mapping the single network service into the plurality of network services.

21. An apparatus comprising:

a service mapper to receive a plurality of network services and map the plurality of network services to a single network service by validating a port number for each of the plurality of network services, policing each of the plurality of network services for a violation of an agreement and encapsulating required ones of the plurality of services, said single network service comprising a network service at a network layer higher than layer 2, and said service mapper to transmit the single network service to a second service mapper; wherein the second service mapper maps the single network service into the plurality of network services.

* * * * *